Nov. 13, 1923.
W. EDSON
1,473,839
VALVE STEM AND GUIDE LUBRICATOR
Filed Nov. 18, 1921
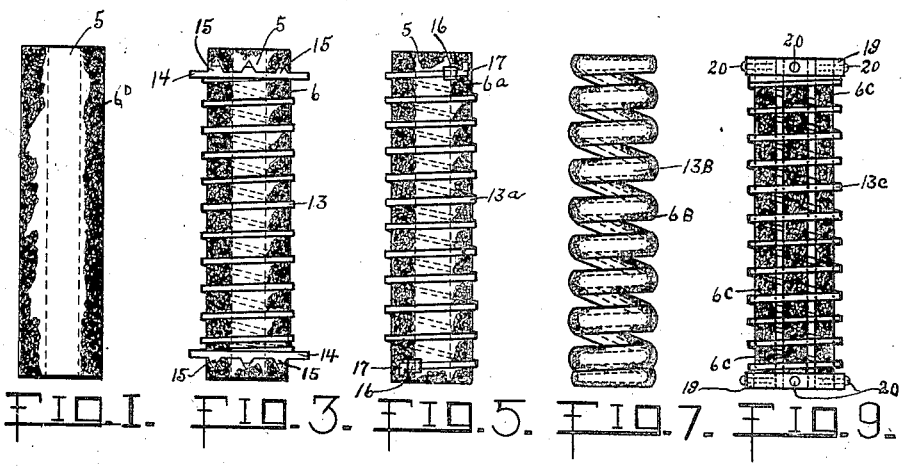
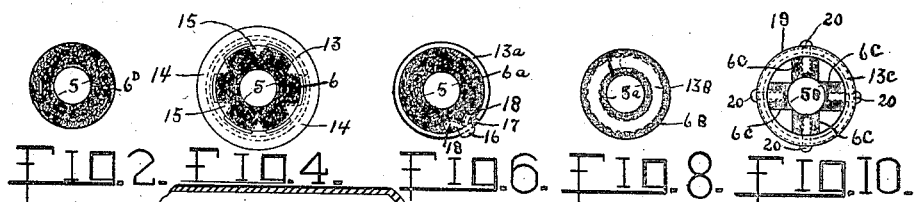
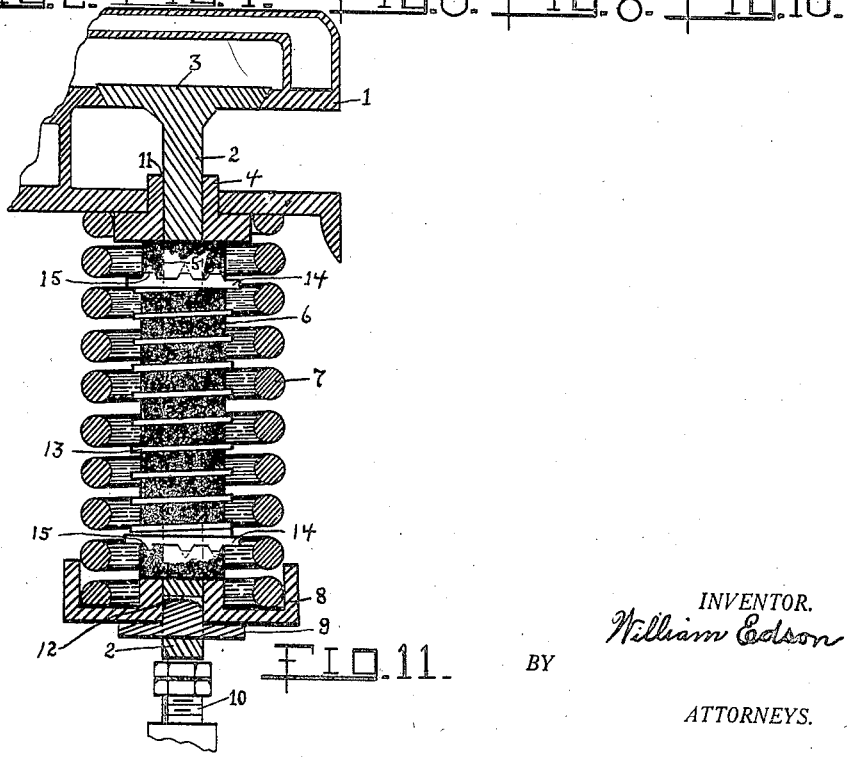
INVENTOR.
William Edson
BY
ATTORNEYS.

Patented Nov. 13, 1923.

1,473,839

UNITED STATES PATENT OFFICE.

WILLIAM EDSON, OF HARRISON, NEW YORK.

VALVE-STEM AND GUIDE LUBRICATOR.

Application filed November 18, 1921. Serial No. 516,182.

*To all whom it may concern:*

Be it known that I, WILLIAM EDSON, a citizen of the United States, and a resident of Harrison, in the county of Westchester and State of New York, have invented certain new and useful Improvements in Valve-Stem and Guide Lubricators, of which the following is a specification.

My invention relates to lubricating means for the valve stems and the guides of internal combustion engines.

Heretofore the valve action of internal combustion engines have been faulty, due to the fact that the carbon formation combined with the gummy oil within the cylinders bind or clog the valve stems in their guides, and with the combined heat and friction of the reciprocating valve stems prevent the proper valve spring action of instantly closing the valves, which allows a deposit of carbon to form on the valve seats preventing their proper seating or closing, which is detrimental to compression in the cylinders, with a consequent loss of power in the engine and a waste of fuel.

My invention eliminates sticking or binding of the valve stems in their respective guides by a positive automatic lubricator applied and retained in contact with the valve stems, so that the continuous lubrication of the valve stems and guides are assured allowing a clean, positive and silent valve action and eliminating pitting, binding and the undue wear of the valve stems and their guides.

One object of my invention is to provide an automatic valve stem and guide lubricator, applied to and in contact with the valve stem so as to control in a ready practical manner the passage of a lubricant to the valve stem and in its guide bearing.

Another object of the invention is the provision of a valve stem and guide lubricator applied to the valve stem and providing automatic lubrication to the valve stem and guide upon the reciprocation of the valve, and the prevention of excessive air suction between the valve stem and guide upon the movement of the engine piston.

Another object of the invention is the provision of tensioning means applied to the lubricator element to retain it in extended relation to the valve stem when the valve is closed and allow its compression on the opening of the valve.

Another object of the invention is the provision of the lubricator element being adapted to wipe the valve stem upon the reciprocation of the valve, applying a lubricant thereon and preventing the adhesion of gummy oil and carbon on the valve stem and in the guide bearing.

Another object of the invention is the provision of the absorbent lubricator element being adapted to absorb the oil spray from the engine's crank case and apply a small quantity directly to the valve stem and guide, upon the reciprocation of the valve stem thru the said lubricating element.

A further object is so to construct and arrange the various parts of the valve stem and guide lubricator as to avoid the necessity of any extended change in the structural arrangement of the valve mechanism already in use for their adaption, thus to render it possible to instantly equip any poppet valve internal combustion engine with the improvements, at but a slight expense.

The above and additional objects are accomplished by such means as are illustrated in the accompanying drawings, described in the following specification and then more particularly pointed out in the claims.

In the drawings accompanying and forming part of this specification, Figure 1 is a side elevational view of my invention as primarily intended and Figure 2 is a top plan view thereof. Figure 3 is a side elevational view of my invention illustrating tensioning means applied to the valve stem lubricator element by means of flanges and Fig. 4 is a top plan view thereof. Figure 5 is a side elevational view of a modification of my invention illustrating tensioning means applied directly to the valve stem lubricator element and Fig. 6 is a top plan view thereof. Figure 7 is a side elevational view of a modification of my invention having tensioning means integrally incorporated therein the lubricator element and Figure 8 is a top plan view thereof. Figure 9 is a side elevational view of a modification of my invention illustrating the axially extending strips of flexible absorbent material comprising the valve stem lubricator with tensioning means applied thereto and Figure 10 is a top plan view thereof. Fig. 11 is a side elevational view partly in section of the valve mechanism of an internal combustion engine illustrating my invention applied and retained onto the valve stem.

The invention consists primarily in an automatic lubricator for the valve stems and guides of internal combustion engines comprising a hollow cylindrical or tubular wicking adapted to be applied to and encompass the valve stems and absorb lubricant as the oil mist or spray coming from the engine's crank case, or which may be applied directly thereto by hand to automatically lubricate the valve stems and guides upon the reciprocation of the valves.

In the form of the invention shown in Figures 1 and 2 the valve stem lubricator element 6$^d$ is constructed of a hollow cylindrical formation of a suitable flexible material, capable of absorbing a lubricant as of oil and applying it in a small quantity or film to the valve stem 2, upon its reciprocation thru the central opening 5 thereof, the application and operation of the said form of the lubricating element 6$^d$ being identical as in the modifications hereinafter described, with the exception of tensioning means being eliminated therefrom.

The most important feature and the gist of my invention resides in the lubricating means or member of my device. This member is made of closely packed or woven material to form an inherently elastic body, which is capable of compression to expel the necessary amount of oil for lubricating and immediately upon release of compression, will automatically return to normal extended position, and during such return will draw in sufficient oil to effect lubrication when again compressed.

The lubricating member is thus capable of practical and efficient service either alone or with an associated spring tensioning means. In the forms of the invention shown in Figures 3, 4, 5, 6, 9, 10 and 11 I have applied tensioning means comprising the helical compression springs 13, 13$^a$ and 13$^c$ encompassing the lubricating elements 6, 6$^a$ and 6$^c$, to retain them in extended relation to the valve stem 2 when the valve 3 is in a closed position, and allow their compression on the opening of the said valve. In the forms of the invention shown in Figures 3, 4 and 11, I have applied tensioning means to the lubricating element 6, comprising a helical compression spring 13 encompassing the said lubricator element 6 and retained thereon by the flanges 14 which have holding or retaining prongs 15 integral therewith which pierce and are clinched into the material of the lubricator element 6 adjacent its ends to allow its compression and extension onto the valve stem 2 on the reciprocation of the valve 3 by the extension of the helical compression spring 13 bearing against the flanges 14 which places a tension onto the lubricator element 6.

In the modifications of the invention shown in Figures 5 and 6 the helical compression spring 13$^a$ comprising the lubricator tensioning means encompasses the hollow cylindrical lubricator element 6$^a$ and is retained thereon by the U shaped clips 16 which grasp the helical compression spring 13$^a$ adjacent the ends 17 which are bent to prevent their slipping from under the said clips 16, its prongs 18 of which pierce and are clinched into the lubricator element 6$^a$ for their retention on the said element. In the modification of the invention shown in Figures 7 and 8 the lubricator element and tensioning means for its extension on the valve stem 2 comprise the helical compression spring 13$^b$ integrally incorporated with a fibrous material 6$^b$ which is flexible and adapted to absorb a lubricant as of oil, woven around the convolutions of the said spring 13$^b$ and forming the central opening 5$^a$ which is adapted to receive the valve stem 2 therein and impart a film of lubricating oil onto it, upon its contact in reciprocating thru the said opening and distributing it into the valve stem guide bearing 11 on passing thru. In the modification of the invention shown in Figures 9 and 10 the valve stem and guide lubricator with tensioning means applied thereto comprise axially extending strips of a fibrous lubricant absorbing material 6$^c$ attached onto the flanges 19 at their ends by the rivets 20, the helical compression spring 13$^c$ encompassing the said lubricating strips 6$^c$ with its ends bearing against the inner sides of the flanges 19 to extend the complete lubricator assembly onto the valve stem 2 which is adapted to enter and reciprocate thru the central opening 5$^b$ and in contact engagement with the lubricating members 6$^c$ which lubricate it and the valve guide bearing 11.

The application and operative principle of the invention with tensioning means applied to the lubricator elements as primarily intended and in the modifications is identically the same and in describing the application and operation of my invention reference will be had to Fig. 11 in which I have shown my invention applied to the valve stem of an internal combustion engine. The numeral 1 designating a fragmentary section of an internal combustion engine with the stem 2 of the valve 3 inserted into and in operative position thru the valve stem guide 4 and the central opening 5 of the lubricator element 6 which is composed of a flexible fibrous or the like substance encompassing and extending downward onto the valve stem 2 from the projection of the valve stem guide 4 and bottoms into the valve spring cup washer 8, said member 8 being adapted to receive oil therein to be absorbed by the lubricator element 6 by capillary attraction and applying a film of lubricant onto the valve stem 2 the said member which in turn lubricates the valve stem guide bearing 11 upon the reciprocation of the valve 3 with the stem 2 in contact engagement through the opening 5 of the lubricator element 6. Lubricating oil may also be applied directly to the lubricator element 6 by hand to be absorbed therein and is also adapted to receive and absorb the oil spray or leakage from the engine crank case adjacent the valve tappet 10.

In applying the lubricator element 6 to the stem 2 of the valve 3 the lubricator element 6 with tensioning means applied thereto is loosely inserted into the central opening of the valve spring 7 the said member containing the lubricator element 6 therein is then positioned over the projection of the valve stem guide 4 and over the valve tappet 10, the stem 2 of the valve 3 is then entered through the valve stem guide 4 and the central opening 5 of the lubricator element 6, the valve spring 7 is then compressed around the valve stem 2 and the lubricator 6 to allow the key 9 to be entered under the valve spring washer 8 and into the keyway 12 of the valve stem 2 thus locking the lubricator onto the valve assembly.

On the opening of the valve 3 the lubricator member 6 is compressed onto the valve stem 2 by the valve spring washer 8 being in contact with the lower end of the said lubricator member 6 and forcing its upper end against the projection of the valve stem guide 4 and on the closing of the valve 3 the lubricator member 6 is extended onto the valve stem 2 by the helical compression spring 13 encompassing the lubricator member 6 between the flanges 14 and exerting an outward pressure to them. The tensioning means applied to the lubricator member 6 retains it in partly extended relation to the valve stem 2 in any operative position of the valve 3 and likewise prevents its sagging on the stem 2 by its complete extension upon the closing of the said valve 3.

In practice, I have found that the forms of device herein shown and described are admirably adapted to fulfill the objects primarily stated, but it is to be understood that it is not intended to confine the invention to any one form of embodiment herein disclosed, for it is susceptible of embodiment in the various forms all coming within the scope of the claims which follow.

Having described the invention what I claim as new and desire to have protected by Letters Patent is:—

1. In combination with a valve stem, valve spring and supporting means, of lubricating means for said stem, consisting of a pliable fibrous member of helical or coil shape.

2. In combination with a valve stem, valve spring and supporting means, of lubricating means for said stem, consisting of a pliable fibrous member of helical or coil shape and a spring enclosed in said member.

3. As a new article of manufacture, a lubricating element for valve stems, composed of self sustaining inherently elastic material formed to embrace a valve stem within its spring and adapted upon compression to expel oil for lubricating the stem and upon release of compression to return to normal position and draw in oil.

4. As a new article of manufacture, a lubricating element for valve stems, composed of self sustaining inherently elastic material formed to embrace a valve stem within its spring and adapted upon compression to expel oil for lubricating the stem and upon release of compression to return to normal position and draw in oil, and a tensioning spring connected to said lubricating element.

5. In a valve stem lubricator, the combination with a valve stem, its support and spring, of a lubricating element composed of self sustaining inherently elastic material formed to embrace the valve stem within its spring and adapted upon compression to expel oil for lubricating the stem and upon release of compression to return to normal position and draw in lubricant.

6. A valve stem lubricator, comprising a sleeve of compressible and expansible self sustaining absorbent material adapted to be applied to the valve stem and upon compression supply lubricant and upon release to return to normal position.

Signed at Harrison in the county of Westchester and State of New York this 14th day of November A. D. 1921.

WILLIAM EDSON.